United States Patent [19]
Baez

[11] Patent Number: 6,070,712
[45] Date of Patent: Jun. 6, 2000

[54] HIGH EFFICIENCY MECHANICAL TRANSDUCER

[76] Inventor: Fernando Baez, 8977 Wiles Rd., Apt. 108, Coral Springs, Fla. 33067

[21] Appl. No.: 09/072,057

[22] Filed: May 4, 1998

[51] Int. Cl.⁷ .................................................. B65G 17/16
[52] U.S. Cl. ................ 198/802; 198/803.13; 198/469.1; 198/470.1
[58] Field of Search .................................... 198/802, 597, 198/470.1, 469.1, 612, 803.13

[56] References Cited

U.S. PATENT DOCUMENTS

| | | | |
|---|---|---|---|
| Re. 31,338 | 8/1983 | Hurt | 417/229 |
| 777,171 | 12/1904 | Abraham . | |
| 1,528,258 | 3/1925 | Michalik . | |
| 3,612,254 | 10/1971 | Wideman | 198/802 |
| 3,664,482 | 5/1972 | Kornylak | 198/802 |
| 3,743,913 | 7/1973 | Rebucci | 340/676 |
| 3,770,107 | 11/1973 | Michelbach | 198/633 |
| 3,828,878 | 8/1974 | Clapsaddle, Jr. | 180/53.7 |
| 4,041,785 | 8/1977 | Roark | 74/11 |
| 4,130,196 | 12/1978 | Schwab | 198/800 |
| 4,321,018 | 3/1982 | Hurt . | |
| 4,396,109 | 8/1983 | Nambu | 198/431 |
| 4,478,328 | 10/1984 | Heiland | 198/485.1 |
| 4,501,350 | 2/1985 | Muller et al. | 198/477.1 |
| 4,722,355 | 2/1988 | Moe et al. | 134/73 |
| 4,846,337 | 7/1989 | Kuhlmann | 198/475.1 |
| 5,056,202 | 10/1991 | Stiegler | 29/33 P |
| 5,292,111 | 3/1994 | Hansch | 270/52.27 |
| 5,340,431 | 8/1994 | Terada | 156/359 |
| 5,507,073 | 4/1996 | Aldridge | 19/5 A |
| 5,684,335 | 11/1997 | Ou | 290/54 |

*Primary Examiner*—Christopher P. Ellis
*Assistant Examiner*—Jeffrey A. Shapiro
*Attorney, Agent, or Firm*—Malloy & Malloy, P.A

[57] ABSTRACT

A high efficiency mechanical transducer assembly including a primary drive assembly defined by at least one but preferably a plurality of synchronized conveyors being vertically oriented and structured to travel in a continuous path which is defined in part by a downward path segment and an upward path segment. A plurality of elongate arms are movably coupled at proximal ends thereof so as to move with each of said conveyors and relative thereto such that the arms automatically assume a collapsed position when travelling along the upward path segment and an outwardly extended position when travelling along the downward path segment. A weight structure is secured adjacent the distal end of each of the arms so as to exert a greater moment of force on a respective conveyor to which they are attached due to the fact that the weight structure of each arm is disposed a greater spaced distance from the respective conveyor than is the weight structure of each of the arms when travelling along the upward path segment and being disposed in the collapsed position. The power takeoff is driven effectively by the plurality of conveyors and delivers usable energy produced by the movement of the plurality of conveyors.

26 Claims, 6 Drawing Sheets

HIGH EFFICIENCY MECHANICAL TRANSDUCER

BACKGROUND OF THE INVENTION

1. Field of the Invention

The present invention relates to a mechanical transducer assembly preferably comprising a plurality of synchronized conveyors moving in a vertically oriented continuous path of travel and operating at a high level of efficiency due to a positive moment of force being continuously exerted thereon due to the selective positioning of weighted arms along upward and downward path segments of the continuous path of travel.

2. Description of the Related Art

Mechanical transducers may generally be defined as devices which serve to transfer energy from a working device or assembly, through a power takeoff means to an applicable workload. It is, of course, axiomatic that any device or assembly designed to produce work energy must do so in such a manner as to overcome the general inefficiencies associated with the actual workings of the device itself, as well as produce a sufficient amount of additional work energy to satisfy the requirements of the desired work load. The laws of physics recognize that, a significant amount of work energy is "wasted" due to the interactions between the various structural components defining an energy producing device or assembly. Natural occurring phenomenon such as friction, gravity, etc., are of course, the primary causes for significantly reducing the efficiency of most drive assemblies or like work producing devices. Numerous attempts have been made to increase the efficiency of drive assemblies or mechanical transducers through the design of better lubricants and/or more efficient bearing assemblies and other more effective interacting components. However, even in light of the improved designs in these areas, loss of significant work energy is the result of work producing devices operating at less than maximum efficiency. Naturally, that lost work energy would ideally be available for use if a drive assembly were operated at close to 100% efficiency.

Based on the above, it is a well recognized principle that work producing mechanisms cannot operate on a continuous basis and produce sufficient work energy to be transferred to an applicable work load without the input of a certain amount of additional energy. Attempts to overcome this principal have resulted in designs for so-called "perpetual motion" machines which may appear workable upon a cursory review of an initial design therefore, but, which fail to produce meaningful work energy once reduced to prototype or practical application.

Accordingly, while perpetual motion machines of the type described above are generally recognized as being impossible in terms of producing usable work energy, structural modifications of certain mechanical transducers are possible in order to greatly increase the efficiency thereof. A substantial increase in efficiency results in a significant reduction in the energy input normally required to produce a working capable of transferring usable work energy to an applicable or predetermined work load. Therefore, there is a need in the art of mechanical transducers for an assembly having specific design characteristics and cooperative structural components which work together to greatly increase the efficiency of the assembly, thereby minimizing the required energy input and maximizing the available work energy capable of being transferred from the device to a work load of the type described.

SUMMARY OF THE INVENTION

The present invention relates to a mechanical transducer specifically designed to work at a significantly high efficiency level, thereby producing adequate amounts of usable work energy with a relatively minimal amount of input energy being applied thereto. More specifically, the mechanical transducer assembly of the present invention comprises a primary drive assembly including at least one but preferably a plurality of conveyors each of which are substantially equally dimensioned and drivingly interconnected so as to operate in synchronized unison along substantially equivalent paths of travel. Furthermore, each of the conveyors are positioned in a substantially vertical orientation and are elongated so as to travel in a vertical, continuous path of travel. The path of travel is at least partially defined by an upward path segment and a downward path segment. In one preferred embodiment, to be described in greater detail hereinafter, the upward and downward path segments are substantially equal length.

The continuous path of travel of the synchronized conveyors are further defined by an upper and a lower transition zone. The upper transition zone of each conveyor is defined by an arcuate path of travel located at an uppermost end of the synchronized conveyor assembly wherein the conveyor converts its direction or travel from the upward path segment to the downward path segment. Similarly, the lower transition zone of each conveyor is the area of transition wherein the travel of the conveyor converts from the downward path segment to the upper path segment.

An important feature of the present invention is the provision of a plurality of elongate arms movably attached to each conveyor. Each arm has a preferably linear configuration including a proximal end and a distal end. The proximal end of each arm is movably attached to the conveyor by a coupling structure which is specifically designed to provide movement of the arm along with the conveyor during its continuous path of travel as well as movement of the arm relative to the conveyor between an extended position and a collapsed position. The opposite or distal end of each arm includes a weight structure secured thereto. Further, each of the weight structures secured to each of the plurality of arms, attached to each of the plurality of conveyors are preferably of the same weight or measure.

Each of the aforementioned coupling structures includes a positioning assembly formed thereon in the form of at least a first stop member and a second stop member. The stop members are each disposed and cooperatively structured with the distal end of the corresponding arm to limit the movement or position of the arm dependent upon the location of the arm along the continuous path of travel of the respective conveyor. More specifically, during travel of each of the plurality of arms along the upward path segment, the arms assume a collapsed position defined by an angular orientation of the arms relative to the conveyor of less than 45 degrees and preferably in the range of approximately 15 degrees. Such collapsed position is automatically assumed due to gravity and the proximal end of each arm abutting against one of the aforementioned first or second stop members disposed and configured to restrain the arm in the aforementioned angular orientation. As each of the arms travel through the upper transition zone, they pass through an arc of approximately 180 degrees as they travel about the upper longitudinal end of the path of travel with the conveyor to which they are attached. After passing through the upper transition zone, each of the plurality of arms assumes an outwardly extended position. The outwardly extended position is more particularly defined by a substantially perpendicular orientation of each of the arms relative to the conveyor to which they are attached. As the plurality of arms travel along the downward path segment the perpendicular orientation is automatically assumed due to gravity and the proximal end of each arm abutting the other of the first and second stop members.

When the plurality of arms are disposed in their outwardly extended or perpendicular orientation relative to the vertical position of the conveyor on which they are mounted, the weight structures associated with the distal end of each of the arms are located a greater distance from the conveyor than are the weight structures of the arms passing along the upward path segment. Accordingly, a significantly greater moment of force is exerted on the conveyor by the arms travelling along the downward path segment due to the weight structures mounted thereon being located a first spaced distance from the respective conveyor to which they are attached. This first spaced distance is greater than a second spaced distance of the weight structures travelling along the upward path segment.

Further, in another preferred embodiment of the present invention the plurality of arms are all equally spaced from one another and are movably connected, as set forth above, along the entire length of the conveyor. Accordingly, in that the downward path segment and the upward path segment are of a substantially equal length, the same number of arms will be concurrently travelling along each of the upward and downward segments respectively. A distinct mechanical advantage resulting in a much higher level of operating efficiency will result due to the greater moment of force being exerted on the conveyor by the arms travelling along the downward path than the moment of force being exerted on the conveyor by those arms travelling along the upward path segment.

The result of the above described workings of the plurality of synchronized conveyors results in a certain amount of useable work energy being produced. A power takeoff assembly preferably comprising a driven shaft interconnected to a plurality of gear mechanisms is provided. Each of the aforementioned gear mechanisms or sprocket gears are driven by a drive chain secured to the conveyors so as to travel therewith. The drive chain may assume a sprocket chain disposed in driving engagement with each of the aforementioned sprocket gears which in turn serve to drivingly rotate the power takeoff shaft. The power takeoff shaft, of course, may be interconnected in driving relation to any type predetermined or applicable work load as desired.

A power input or driving assembly may also be interconnected to each of the plurality of synchronized conveyors by means of appropriate gearing and/or drive motors in order to supply sufficient input energy to allow for an initial start up of the primary drive assembly and/or provide additionally required input energy when the demands of the power takeoff assembly exceed current production output of work energy by the primary drive assembly.

Other structural features of the present invention include a secondary assembly associated with and extending along the path of each of the plurality of arms of each of the plurality of conveyors as they travel through the aforementioned upper transition zone. Due to the workings of gravity on the movably attached plurality of arms, there is an arc of free-fall wherein the arms are first oriented in a substantially true vertical position and substantially fall through the arc into the aforementioned perpendicular, extended position. In order to eliminate a complete free-fall and reduce any shock or trauma to the conveyors, the secondary assembly comprises a plurality of blades disposed in predetermined, spaced apart location to one another and mounted on a conveyor mechanism having somewhat of an arcuate configuration corresponding generally to the arcuate path of travel of each of the arms as they pass through at least a portion of the aforementioned upper transition zone. The blades of the secondary assembly are disposed and dimensioned to engage a bearing member associated on an outer extremity of a connecting finger extending outwardly from each of the distal ends of each of the arms. Accordingly, through the contact with the bearing structure and connecting finger, the distal end of each of the arms is effectively retained between adjacently positioned ones of the plurality of blades on the continuously movable conveyor defining the secondary assembly. The conveyor assembly and its associated blades are further structured so as to freely release each of the plurality of arms once they assume the aforementioned outwardly extending position and begin their travel along the downward path segment of the respective conveyor to which they are attached.

Therefore, it is a primary object of the present invention to provide a mechanical transducer assembly capable of operating at an extremely high level of efficiency thereby generating significant, usable work energy and transferring such work energy to a predetermined, applicable work load while requiring a minimal input energy for the continued operation thereof.

Another primary object of the present invention is to provide a high efficiency mechanical transducer assembly which is designed and structured to take advantage of the gravitational forces exerted on certain structural components thereof so as to maintain a continued, work producing operation with a minimal input energy requirement.

Yet another important object of the present invention is to provide a high efficiency mechanical transducer including a primary drive assembly which is designed and structured for continuous operation in the transfer of usable work energy to a power takeoff assembly wherein a minimal amount of input energy is required for initial start up and excess energy demands.

Still another important object of the present invention is to provide a mechanical transducer assembly capable of continuous operation at an extremely high efficiency level which is simple in design and structure as well as being efficient and inexpensive to maintain and operate.

It is also an important object of the present invention to provide a high efficiency mechanical transducer designed for continuous operation of the structural components while requiring a minimal amount of repair and/or servicing for maintenance.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
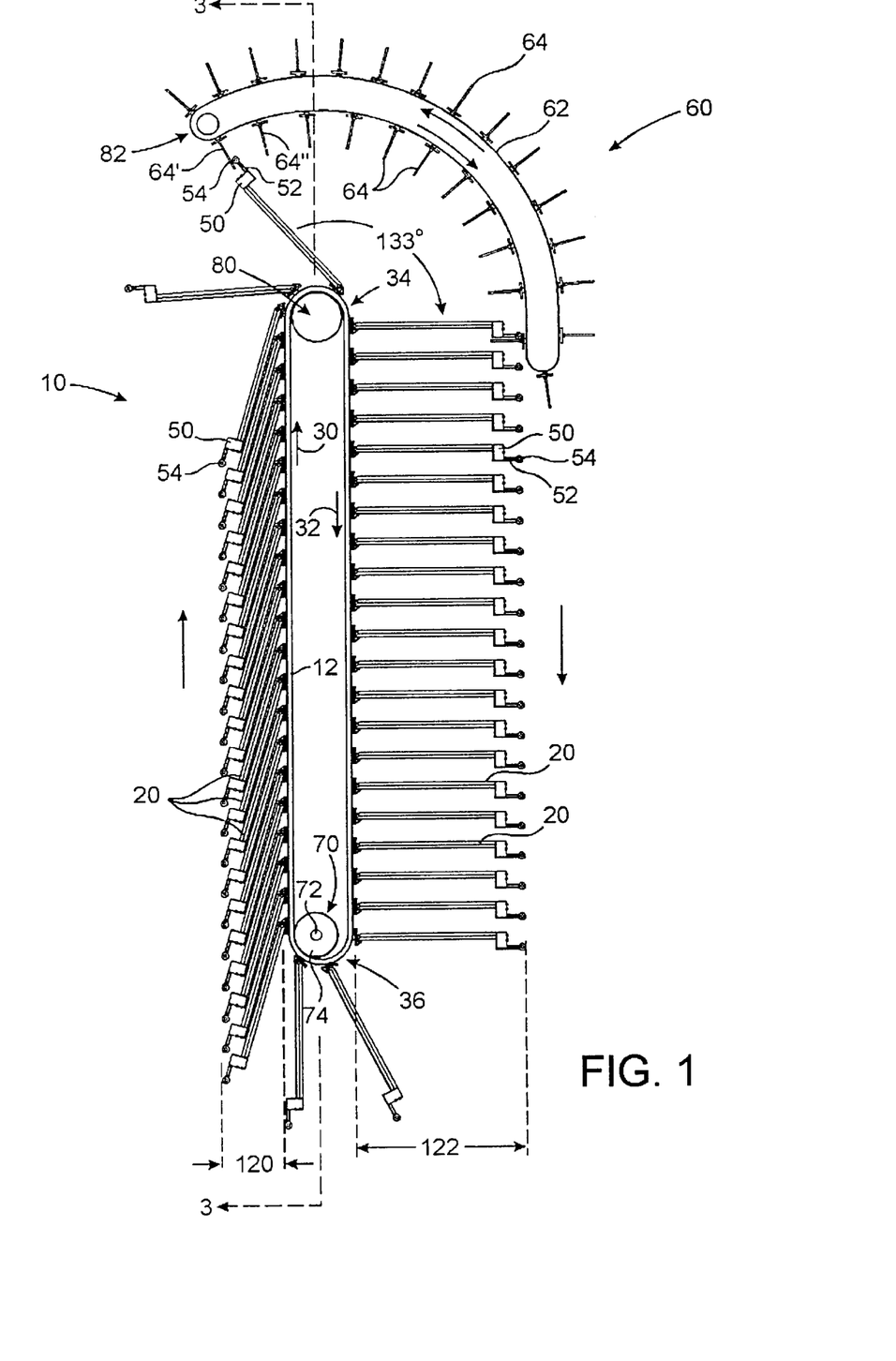
FIG. 1 is a side view in schematic of a primary drive assembly and various structural components associated therewith.

As shown in the accompanying Figures, the present invention is directed towards a high energy mechanical transducer including a primary drive assembly, generally indicated as 10, the primary drive assembly including at least one but preferably a plurality of conveyors 12. For purposes of clarity, the detailed structural features of the primary drive assembly 10 including the plurality of conveyors 12 will be described with reference to a single conveyor of the type shown in the schematic view of FIG. 1. However, it should be emphasized that the workings and structural components of each of the plurality of conveyors 12 are preferably substantially equivalent and accordingly, the description of a single conveyor of the type shown in FIG. 1, is representative and intended to be descriptive of each of the plurality of conveyors 12 regardless of their number.

Figure 2:
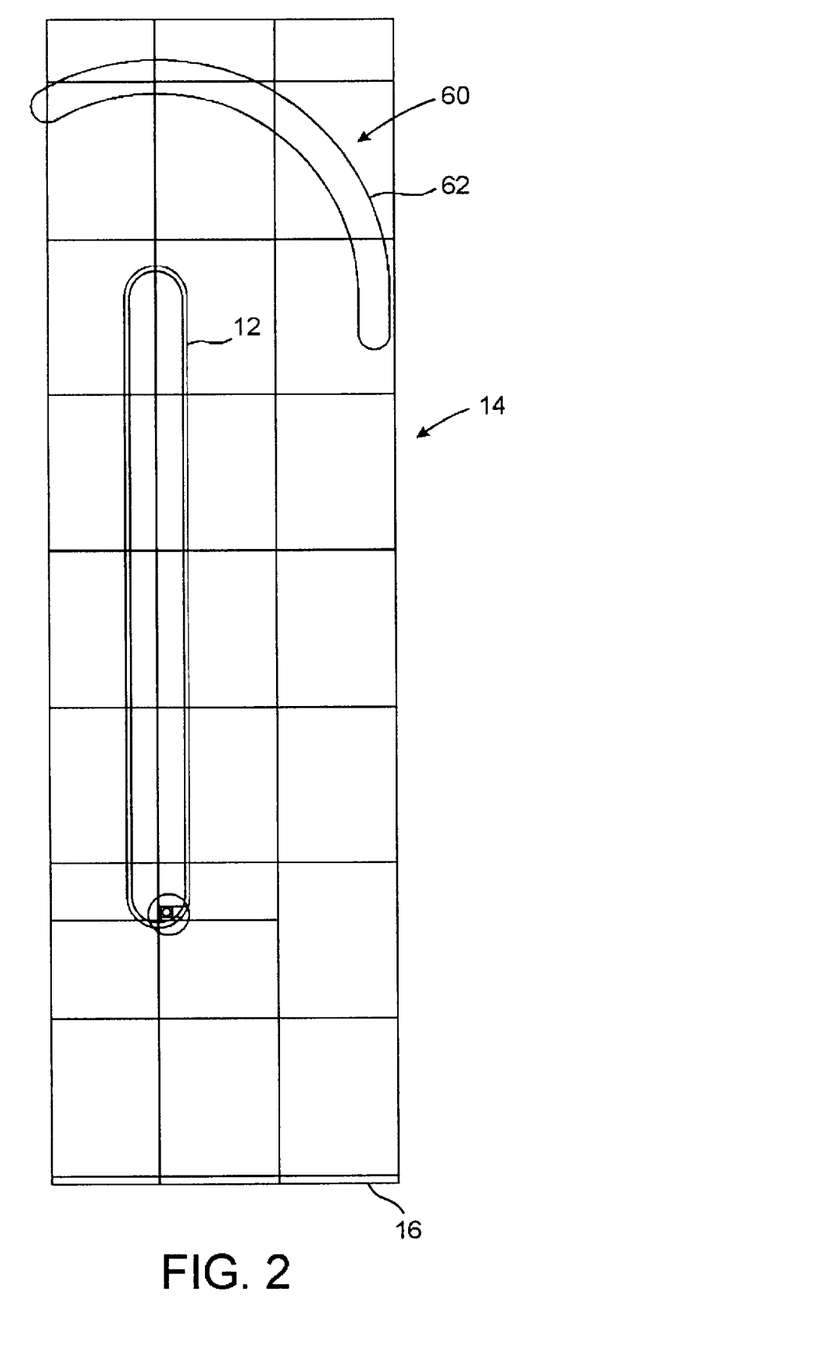
FIG. 2 is a side view of a supporting structure on which the drive assembly of the embodiment of FIG. 1 as well as the various structural components associated with the subject invention will be mounted and supported.

The plurality of conveyors 12 are preferably of the enclosed track conveyor type and are interconnected by any applicable means to be driven in synchronized unison such that corresponding components thereof are disposed to travel in equivalent positions along the continuous, closed path of travel of each of the conveyors 12. Therefore, each of the conveyors 12 preferably includes an elongated configuration mounted on a support base or other adequate support structure generally indicated as 14 in FIG. 2. The support structure 14 may take a variety of structural configurations and be formed of high strength materials having sufficient structural integrity to adequately support the plurality of conveyors 12 during continuous operation thereof as well as any additional structural components associated with the present invention. Further, the support structure 14 has an adequate foundation to be secured to a ground and/or other foundation base generally indicated as 16. In order to accommodate the plurality of conveyors 12 in their preferred vertical orientation the overall structural configuration of the support base or mount 14 also has a substantially vertical, elongated configuration.

Figure 5:
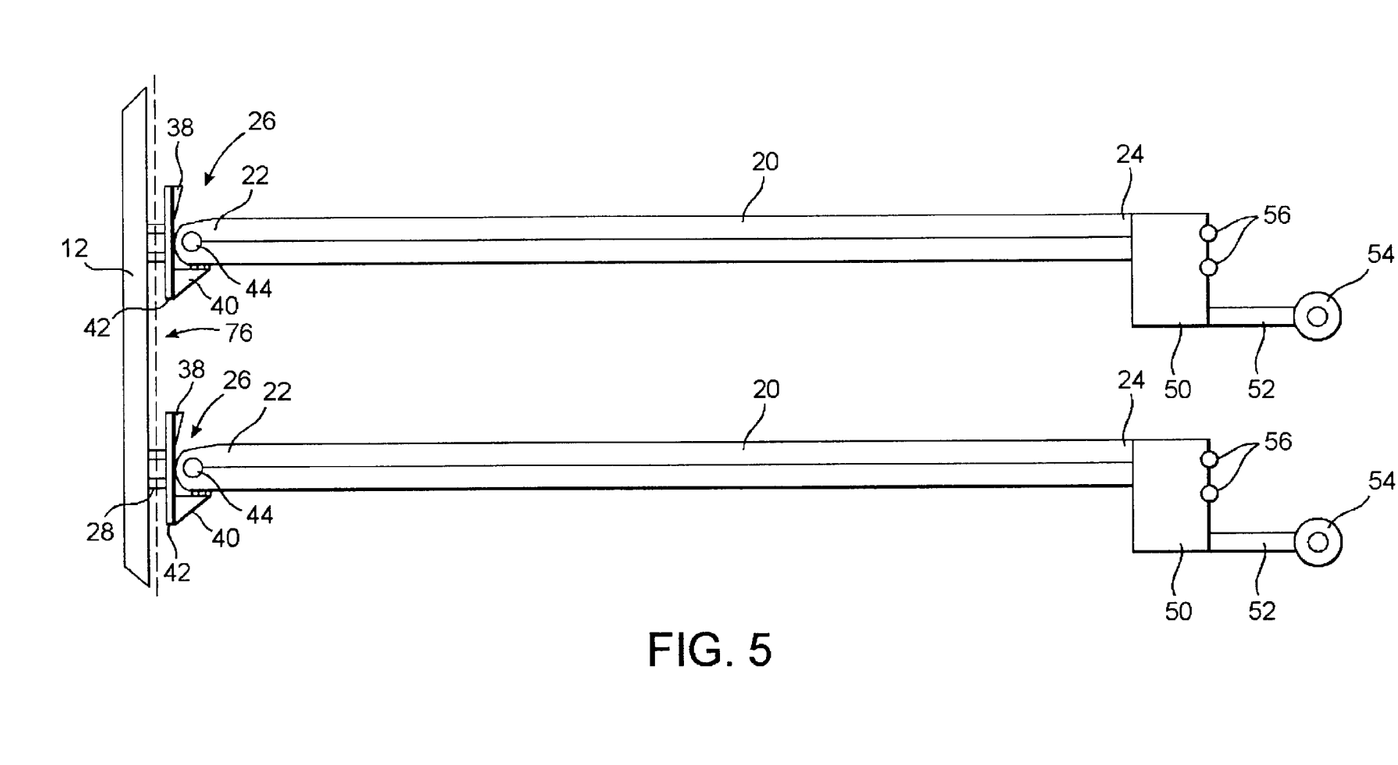
FIG. 5 is a detailed view in partial cutaway showing the structural components of FIGS. 1 and 4 in a different orientation.

As shown in FIG. 5, each of the conveyors 12 includes a plurality of elongate arms 20 formed from a relatively rigid and substantially lightweight material and including a proximal end 22 and a distal end 24. A coupling structure generally indicated as 26 serves to movably attach or interconnect the proximal end of each arm 22 to the conveyor 12 such that the arms are disposed in equally spaced relation to one another continuously along the entire length of the conveyor 12. The coupling structure 26 may be attached to the conveyor by one or more trolley structures as at 28. Moreover, the coupling structure 26 is structured and configured cooperatively with the proximal end 22 of each of the arms 20 so as to provide movement of each of the arms with the conveyor 12 along its continuous path of travel, as well as movement of each of the arms 20 relative to the conveyor 12 during such travel along the continuous path. Again with reference to FIGS. 1 and 3, the continuous path of travel of each of the conveyors 12 is more specifically defined by an upward path segment generally indicted as 30 and a downward path segment generally indicated as 32. The continuous path of travel of each conveyor is defined by an upper transition zone 34 having a semi-circular or arcuate configuration and a lower transition zone 36 having a similar semi-circular or arcuate configuration.

A further feature of the present invention is the automatic positioning of the arms in either a collapsed position or extended positioning. As shown in FIG. 1 when the plurality of arms travel along the upward path segment as indicated by directional arrow 30, they assume the collapsed position. Conversely, when the arms pass along the downward path segment indicated by directional arrow 32, each of the arms automatically assumes an extended position. More particularly, the collapsed position of each of the plurality of arms 20 includes an angular orientation of these arms relative to the conveyor 12 as it moves along the upward path segment 30. Such angular orientation is preferably approximately 15 degrees relative to the vertical orientation of the upward path segment but is specifically significantly less than a 45 degree angular orientation relative to the conveyor 12, and generally represents the orientation of the arms 20 resting atop one another. Conversely, the extended position of each of the arms 20, which is generally achieved in the downward path segment, is defined by each of the arms being oriented in a substantially perpendicular relation to the vertical, downward path segment of the conveyor 12 as shown. This extended position is preferably more affirmatively retained by preventing a normal tendency of the arms 20 to collapse into an orientation similar to that achieved in the upward path segment.

A positioning assembly including a first stop 38 and a second stop 40 is integrally formed on a base portion 42 of the coupling structure 26. The first and second stops 38 and 40 are disposed and cooperatively structured and configured with the proximal end 22 of each of the arms 20 such that pivotal movement of the arms about a pivot point 44 causes the proximal end 22 to come into abutting engagement with the first stop 38 thereby orientating each of the arms 20 in the aforementioned, angularly oriented, collapsed position (See FIGS. 1 and 4). Of course, the arms 20 could be structured to merely come into contact with one another so as to define the first stop therebetween. Conversely, and with reference to FIG. 5, abutting engagement of the proximal end 22 with the second stop member 40 automatically orients each of the arms 20 in the perpendicular, extended position as shown.

Another important feature of the present invention is the provision of a weight structure as at 50, secured adjacent the distal end 24 of each of the arms 20. Each of the weight structures 50 attached to each of the arms 20 is preferably of an equivalent weight or measure and includes an outwardly extending or projecting finger as at 52 having a bearing member 54 secured to the outer extremity thereof. Further, with regard to FIG. 5, one or more points of connection as at 56 are provided on each of the weight structures 50 wherein adjacently positioned weights of adjacently positioned arms of adjacently positioned conveyors are interconnected to one another so as to ensure the movement of each of the arms 20 and in particular each of the weight structures 50 in a synchronized unison. The weights 50 may be connected at points 56 by a variety of applicable interconnecting structures.

Figures 3, 4:
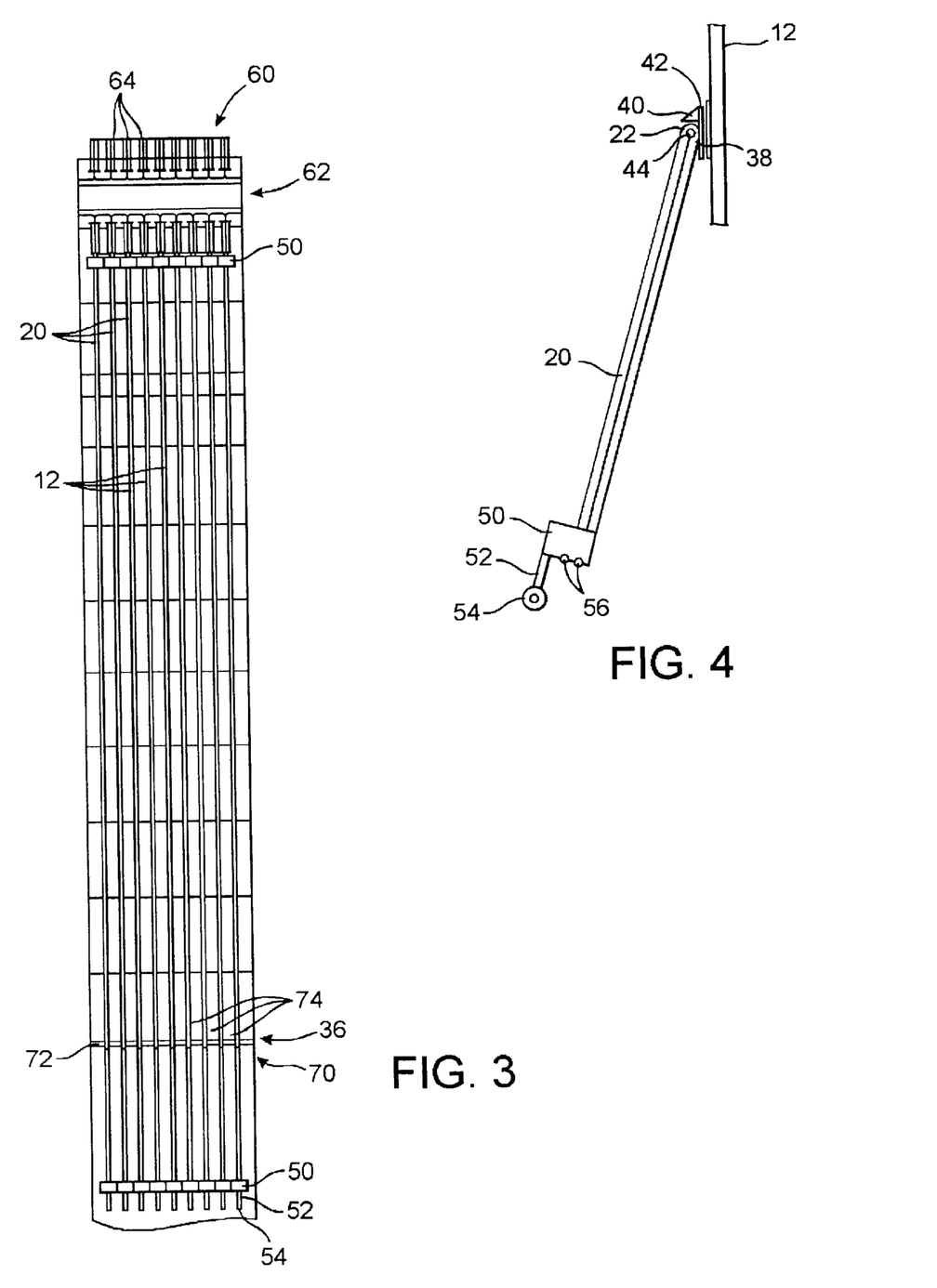
FIG. 3 is a sectional view in schematic along line 3—3 of FIG. 1.
FIG. 4 is a detailed view in partial cutaway of a structural component of the embodiment of FIG. 1.

Therefore, based on the above, it should be apparent that as the plurality of arms 20 travel along the upward path segment 30 each of the arms automatically assume the angularly oriented collapsed position (See FIGS. 1 and 4). Conversely, as the arms pass through the upper transitional zone 34 and into the downward path segment, each of the arms 20 assume the outwardly extended position (See FIGS. 1 and 5). When in the outwardly extended position, each of the weights are located a first spaced distance 122 from the vertically oriented conveyors to which they are attached. Also, when the arms are located in their collapsed position and travelling along the upward path segment 30, the weights are located a second spaced distance 120 from the vertically oriented conveyor. As shown, the first spaced distance 122 is significantly greater than the second spaced distance 120. Accordingly, it should be apparent that the moment of force created by each of the weights located on each of the arms passing along the downward path segment is significantly greater than the moment of force exerted on the conveyor by each of the weights attached to each of the arms passing along the upward path segment. As a result and by taking advantage of these gravitational forces, a significant downward force will be continuously transferred to the conveyors causing their continuous movement since the aforementioned moment of force exerted on the conveyor by the arms travelling along the downward path segment is significantly greater than the "weight" or moment of force exerted on the conveyor by the arms and their attendant weight structures passing along the upward path segment. Continuous travel of each of the aforementioned plurality of conveyors can be accomplished at an extremely high rate of efficiency. Little positive or negative force will be exerted on the conveyor as it passes through the lower transitional zone 36, since the various arms 20 are allowed to pivot freely and therefore exert negative zero force on the conveyor other than that caused by free hanging weights.

Figure 6:
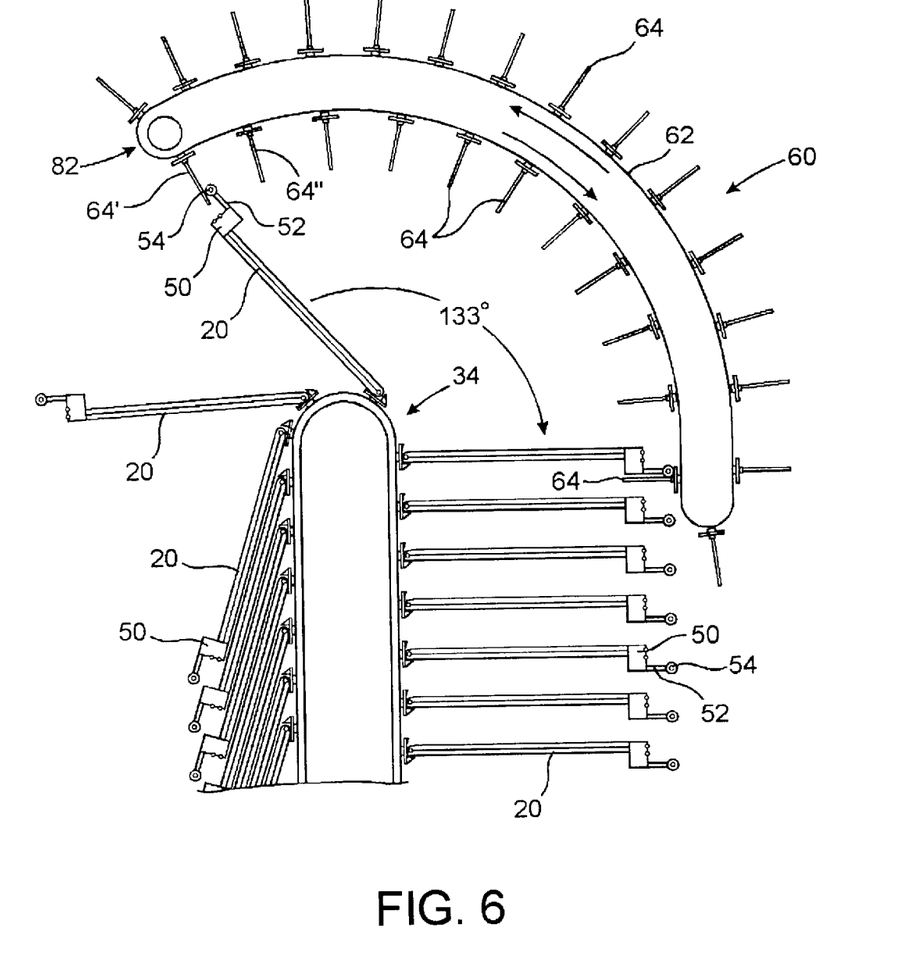
FIG. 6 is a detailed view in partial cutaway showing additional structural features of the embodiment of FIG. 1.
Figure 7:
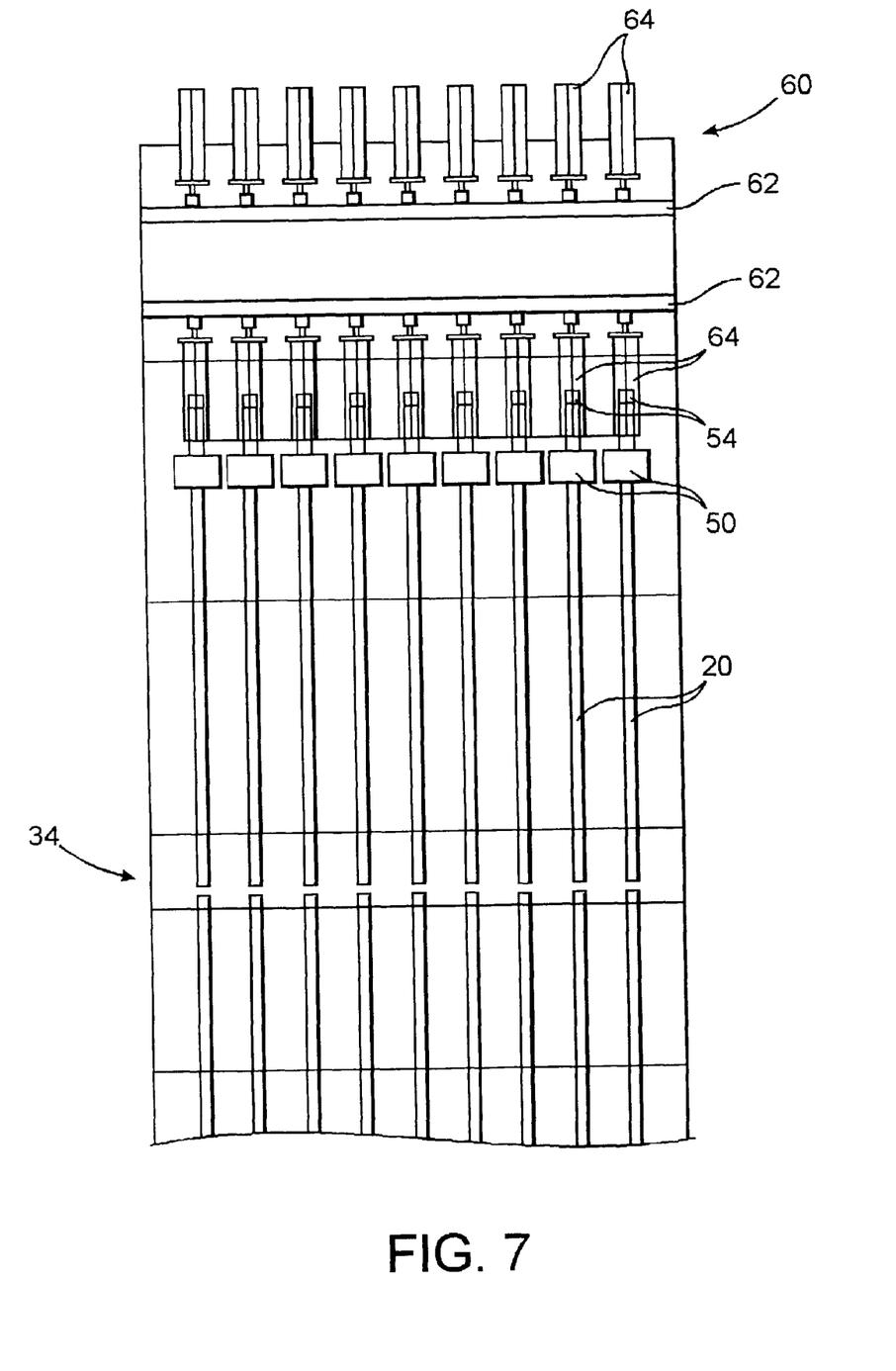
FIG. 7 is a front view in partial cutaway of the embodiment of FIG. 6.

With regard to the upper transitional zone 34, each of the weights travel through approximately an arc of 180 degrees as they pass from the upper path segment to the downward path segment. In order to avoid free falling of each of the arms as they travel through an arcuate path of at least approximately 133 degrees (see FIG. 6), the present invention provides a secondary assembly generally indicated as 60. The secondary assembly 60 includes a plurality of continuous conveyors 62 each having elongated, substantially arcuate configuration at least partially corresponding to the arcuate free fall path of travel of each of the arms 20 as they travel through the upper transitional zone 34. Further, the secondary assembly 60 preferably includes an equal number of conveyors 62 as that of the number of conveyors 12 defining the primary drive assembly. In addition, each of the secondary conveyors 62 includes a plurality of outwardly extending blades as at 64 disposed in equally spaced, relation to one another along the entire length of each conveyor 62. The spacing between the individual blades 64 and the dimension of their length is such as to effectively "catch" and restrain each of the arms 20 as they pass through an arc of at least 133 degrees through the upper transitional zone 34. The aforementioned bearing member 54 connected to the weight 50 by the connecting finger 52 serves contact and engage the blades 64. The outer extremity of each arm 20 is thereby effectively restrained between adjacently positioned ones of the blades 64 as at 64' and 64" in FIG. 1.

Other structural features of the present invention comprise the existence of a power takeoff assembly generally indicated as 70 and including a driven power take off shaft as at 72 connected to a plurality of gears, such as sprocket gears 74. There is a sprocket gear 74 fixedly attached to rotate with and drivingly rotate the power takeoff shaft 72 by its mating engagement with a sprocket type drive chain (not shown for purposes of clarity). The drive chain is preferably secured to and travels with each of the conveyors 12 along the continuous length thereof. A preferred embodiment of the present invention includes each of the conveyors 12 disposed in driving interconnected engagement with respective ones of the sprocket gears 74 by virtue of the mating engagement with the sprocket chains and respective ones of the sprocket gears 74. The power shaft 70 may be connected to a predetermined or applicable work load having appropriate energy demands.

Another embodiment of the present invention comprises the provision of a first input of energy preferably in the form of one or more drive motors 80 interconnected to each of the plurality of the conveyors 12 by appropriate gearing (not shown for purposes of clarity). The energy or power input in the form of the drive motor 80 may be utilized for the initial startup of the subject mechanical transducer assembly 10 and also may be used to supply additional power or energy input to the entire transducer assembly 10 when the energy demands of the power take off and accordingly the work load connected thereto reach a point where they are not satisfied or fulfilled by the continuous operation of the transducer assembly 10 when the drive motor or motors 80 are not activated. Of course, the drive motor could also comprise a manual actuation, such as by a crank or like mechanism, if desired.

Yet an additional embodiment further includes a secondary drive motor as at 82 which may be disposed in driving engagement with the secondary conveyor 62 of the secondary assembly 60. The drive or input motor 82 may be activated to maintain a continuous movement of the one or more secondary conveyors 62 so as to effectively "catch" and retain each of the arms 20 as they pass through the upper transition zone 34 as described above.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A high efficiency mechanical transducer assembly comprising:
   a) a primary drive assembly including at least one conveyor disposed in a substantially vertical orientation,
   b) said at least one conveyor structured and further configured to move in a substantially elongated, continuous path of travel defined in part by an upward path segment, and a downward path segment,
   c) a plurality of elongate arms each having a distal end and a proximal end, said proximal end movably interconnected to said one conveyor so as to move therewith and relative thereto,
   d) a plurality of weight structures each mounted on a different one of said plurality of arms adjacent said distal end thereof and movable with said arms relative to said one conveyor, e) each of said plurality of arms disposable in a collapsed position when passing along said upward path segment and disposable in an extended position when passing along said downward path segment, f) said extended position at least partially defined by said weight structure of each of said plurality of arms disposed a first spaced distance from said one conveyor and said collapsed position at least partially defined by said weight structure of each of said plurality of arms disposed a second spaced distance from said one conveyor, and g) said first spaced distance being significantly greater than said second spaced distance such that a number of said plurality of arms passing along said downward path segment exert a significantly greater moment of force on said conveyor than do a number of said plurality of arms passing along said upward path segment.

2. An assembly as in claim 1 wherein said extended position is further defined by a substantially perpendicular orientation of said plurality of arms relative to said one conveyor when passing along said downward path segment.

3. An assembly as in claim 2 wherein said collapsed position is further defined by an angular orientation of less than 45 degrees of each of said plurality of arms relative to said one conveyor when passing along said upward path segment.

4. An assembly as in claim 3 wherein said collapsed position is further defined by an angular orientation of substantially 15 degrees of each of said plurality of arms relative to said one conveyor when passing along said upward path segment.

5. An assembly as in claim 3 further comprising a plurality of coupling structures each movably interconnecting a different one of said plurality of arms at said proximal end thereof to said one conveyor; each of said coupling structures including a positioning assembly formed thereon and disposed and cooperatively structured with said proximal end to maintain disposition of said one arm in said collapsed position and said extended position when said one arm passes along said upward path segment and said downward path segment respectively.

6. An assembly as in claim 5 wherein said positioning assembly includes a first stop and a second stop each disposed and cooperatively structured with said proximal end of said one arm to engage and maintain said one arm in said collapsed position and said extended position respectively.

7. An assembly as in claim 1 wherein said plurality of arms are substantially equal in length and said plurality of weight structures attached thereto are substantially of equal measure.

8. An assembly as in claim 7 wherein each arm passing along said downward path segment exerts a greater moment of force on said one conveyor than does any one of said number of arms passing along said upward path segment.

9. An assembly as in claim 1 wherein said continuous path of travel is further defined by an upper transition zone and a lower transition zone each disposed at opposite ends of said one conveyor between said upward path segment and said downward path segment.

10. An assembly as in claim 9 wherein said upper transition zone comprises a portion of said continuous path of travel wherein each of said plurality of arms pass substantially from said collapsed position to said extended position; and said lower transition zone comprising a portion of said continuous path of travel wherein each of said plurality of arms passes substantially from said extended position to said collapsed position.

11. An assembly as in claim 10 further comprising a secondary assembly disposed adjacent said upper transition zone and structured to engage each of said plurality of arms as it passes through said upper transition zone.

12. An assembly as in claim 11 wherein said secondary assembly is configured and further structured to restrain free fall travel of each arm through an arc of less than 180 degrees to said extended position.

13. An assembly as in claim 1 further comprising a power takeoff assembly interconnected in driven relation to said one conveyor and structured to transfer usable energy from said primary drive assembly to a predetermined load.

14. An assembly as in claim 13 further comprising a power input assembly connected in driving relation to said primary drive assembly and structured for operative driving engagement with said one conveyor upon energy demands of said power takeoff assembly exceeding useable energy produced by said primary drive assembly.

15. A high efficiency mechanical transducer assembly comprising:

a) a primary drive assembly including a plurality of elongated conveyors collectively mounted in a substantially vertical orientation, b) said plurality of conveyors structured and disposed to move in substantially equivalent, continuous path of travel, c) each continuous path of travel at least partially defined by an upward path segment and a downward path segment being of substantially equal length, d) each of said plurality of elongate arms movably interconnected at a proximal end thereof to a respective one of said conveyors, so as to move therewith and relative thereto, e) each of said plurality of arms on each of said plurality of conveyors having a weight structure mounted adjacent a distal end thereof, f) each of said plurality of arms of each of said plurality of conveyors disposable in a collapsed position when passing along said upward path segment and disposable in an extended position when passing along said downward path segment, g) said extended position at least partially defined by said weight structure of each of said plurality of arms disposed a first spaced distance from a respective one of said conveyors and said collapsed position at least partially defined by said weight structure of each of said plurality of arms disposed a second spaced distance from a respective one of said plurality of conveyors, and h) said first spaced distance being significantly greater than said second spaced distance such that a number of said plurality of arms passing along said downward path segment exert a significantly greater moment of force on said respective ones of said conveyors than do a number of said plurality of arms passing concurrently along said upward path segment of respective ones of said conveyors.

16. An assembly as in claim 15 wherein each of said plurality of conveyors include said plurality of arms interconnected thereto being of substantially equal length and having respective weight structures mounted thereon being of substantially equal weight.

17. An assembly as in claim 16 wherein each of said plurality of conveyors include said plurality of arms interconnected thereto at substantially equally spaced intervals along a continuous length thereof.

18. An assembly as in claim 15 wherein each said extended position is further defined by a substantially perpendicular orientation of each of said plurality of arms relative to a respective one of said plurality of conveyors passing along said downward path segment thereof.

19. An assembly as in claim 18 wherein each arm passing along said downward path segment exerts a greater moment of force on a respective one of said conveyors than does any one of said number of arms passing along said upward path segments.

20. An assembly as in claim 15 wherein said plurality of conveyors are collectively synchronized such that said plurality of arms on each conveyor move along respective ones of said continuous paths of travel in aligned unison with said plurality of arms on a remainder of said plurality of conveyors.

21. An assembly as in claim 20 wherein each of said continuous paths of travel is further defined by at least an upper transitional zone disposed at an upper longitudinal end thereof between said upward path segment and said downward path segment.

22. An assembly as in claim 21 further comprising a secondary assembly disposed adjacent said upper transition zone and structured to engage each of said plurality of arms as it passes through said upper transition zone.

23. An assembly as in claim 15 further comprising a power take off assembly interconnected in driven relation to each of said plurality of conveyors and structured to transfer usable energy produced by collective movement of said plurality of conveyors to a predetermined load.

24. A high efficiency mechanical transducer assembly comprising:
  a) a primary drive assembly including at least one elongate conveyor mounted in a substantially vertical orientation and structured and configured to move in a continuous path of travel,
  b) said continuous path of travel at least partially defined by an upward path segment and a downward path segment and an upper transitional zone located therebetween,
  c) a plurality of elongate arms of substantially equal length movably interconnected at a proximal end thereof to said one conveyor for movement therewith and relative thereto,
  d) a distal end of each of said plurality of arms having a weight structure of equal measure mounted thereon,
  e) each of said plurality of arms disposable in a collapsed position and an extended position when passing along said upward path segment and said downward path segment respectively,
  f) said extended position defined by said arm oriented in a substantially perpendicular relation to said one conveyor and said weight structure mounted thereon disposed at a first spaced distance from said conveyor,
  g) said collapsed position defined by said arm disposed in an angular orientation of less than 45 degrees from said conveyor and said weight structure thereon disposed at a second spaced distance from said conveyor,
  h) said first spaced distance being significantly greater than said second spaced distance such that a number of said plurality of arms passing along said downward path segment collectively exert a significantly greater moment of force on said one conveyor than do a number of said plurality of arms passing concurrently along said upward path segment,
  i) a power takeoff assembly interconnected in driven relation to said one conveyor and structured to transfer usable energy produced by movement of said conveyor to a predetermined load, and
  j) a power input assembly connected in driving relation to said primary drive assembly and structured for at least temporary operative driving relation to said one conveyor upon energy demands of said power takeoff assembly exceeding usable energy produced by said primary drive assembly.

25. An assembly as in claim 24 wherein each of said plurality of arms are movably interconnected a substantially equally spaced distance from one another along said continuous path of travel.

26. An assembly as in claim 25 wherein a number of said plurality of arms passing along said downward path segment is at least equal to a number of arms passing along said upward path segment during continuous movement of said one conveyor along said continuous path of travel.

* * * * *